United States Patent Office 2,996,556
Patented Aug. 15, 1961

2,996,556
METHOD FOR THE PREPARATION OF ALKENES AND ALKADIENES
Edgar M. Ilgenfritz and Robert P. Ruh, Midland, Mich., assignors to The Dow Chemical Company, Midland, Mich., a corporation of Michigan
No Drawing. Filed Dec. 24, 1958, Ser. No. 782,639
10 Claims. (Cl. 260—653.5)

This invention relates to an improved method for the preparation of fluorohaloalkenes and fluorohaloalkadienes.

It is known in the art that fluorohaloalkenes and fluorohaloalkadienes of the type specified above may be prepared from a fluorohaloalkane either by treatment with zinc in a solvent such as dry ethanol or by catalytic hydrogenation over a suitable metal catalyst such as silver. In the former case, care must be exercised to insure the virtually complete absence of water as the reaction is retarded or prevented if water is present in more than minute amounts. The hydrogenation method is restricted to comparatively few compounds and requires a considerable investment in apparatus.

In the present invention, however, an aqueous system of ammonium chloride and zinc is employed as the means for dehalogenating an aliphatic fluorine-containing carbon compound. The measures adopted in the prior art for maintaining an essentially anhydrous system are obviated, the reaction proceeds at a satisfactory rate, is easily controlled, and gives the desired product in high yields.

Starting materials for the process of the present invention are aliphatic fluorine-containing carbon compounds containing from 2 to 6 carbon atoms and having a plurality of halogen atoms, which may be chlorine or bromine, wherein the halogen atoms other than fluorine are at least attached to adjacent carbon atoms, at least one of said carbon atoms having a fluorine atom attached thereto, and said adjacent carbon atoms being adjacent through a saturated bond. Specific illustrations of suitable starting materials include, for example, 1-fluoro-1,2,2-trichloroethane;
1,2,2-trichloro-1,1,2-trifluoroethane;
1,2,2-trichloro-1,1-difluoroethane;
1,2-difluoro-1,2-dichloro-1,2-dibromoethane;
1-chloro-1,3-difluoro-2,3-dibromopropane;
1,2-dichloro-1,2,3-trifluoropropane;
1,2-dibromo-1,2,3,4-tetrafluorobutane;
1,2,4-trichloro-1,3,4-trifluorobutane;
1,2-dibromo-3,4-dichlorohexafluorobutane;
1,2,4,5-tetrachloro-1,1,2,3,4,5,5-heptafluoropentane;
1,2,3,4-tetrachloro-1,1,3,4,5,5,5-heptafluoropentane;
1,2-dibromo-5,6-dichloro-decafluorohexane.

The said aliphatic fluorine-containing carbon compound is contacted with zinc, ammonium chloride, and water to obtain substantial reaction. Addition of a small quantity of an organic surfactant, although not required, has been found to increase the reaction rate through increased mixing. The reaction mixture is maintained at a temperature between about 0 and 100° C., preferably between 35 and 80° C., desirably at the reflux temperature of the reaction mixture. Pressure on the reaction may be varied but it is desirable to operate at atmospheric pressure. The desired product is then distilled and separated from the reaction mixture.

There are certain permissible variations relating to the starting materials. The zinc used may be powdered, granulated or mossy zinc, but the granular type is preferred. Distilled or deionized water is ideal, but tap water is satisfactory. Specific organic surfactants shown to aid the reaction include Aerosol MA, perfluoro octanoic acid, and Kel-F acid No. 8114, however, other organic surfactants which do not adversely affect the reactants, reaction conditions or reaction products may be used. The amount of ammonium chloride used is not critical, varying from a 1 mole concentration to saturation, however, a 3–6 molar solution is preferred. The zinc must be present in at least stoichiometric amounts, i.e., one mole of zinc per two atoms of halogen to be removed in the aliphatic fluorine-containing carbon compound, and a slight excess of zinc is preferred to insure a substantially complete and rapid reaction. Where it is desirable to raise the reaction temperature of the mixture to increase reaction rate, a relatively high boiling solvent such as xylene, ethylbenzene, diethylbenzene, mesitylene, and the like, may be added. This solvent is most effective when it is completely miscible with the alkane to be reacted and it must be inert in the reaction medium. Separation of the resulting unsaturated fluorine-containing compound is readily accomplished by fractional distillation in a conventional manner.

The following examples are given to illustrate the present invention, but are not to be construed as limiting the invention thereto.

*Example I*

A three-necked, one liter, round-bottom flask was fitted with a water-cooled, 8-bulb condenser, a mercury-sealed glass stirrer, a heating mantle, and a thermometer. The flask was charged with 141 grams of 1,2,2-trichloro-1,1,2-trifluoroethane, 65 grams of granular zinc, 53 grams of ammonium chloride, 300 grams of water, and 0.2 gram of Kel-F acid No. 8114 (M. W. Kellogg Co.). The reaction mixture was stirred and refluxed for approximately three hours, until no oil layer remained in the reaction flask. The temperature remained virtually constant at 37° C. during the entire reflux period. The distilled product was collected overhead in a Dry Ice-acetone-cooled trap and was shown by fractional distillation to be 70.2 percent 1-chloro-trifluoroethylene having a boiling point of −28° C.

*Example II*

The apparatus identical to that in Example I was charged with 141 grams of 1,2,2-trichloro-1,1,2-trifluoroethane, 65 grams of granular zinc, 53 grams of ammonium chloride, 300 grams of water, 0.4 gram of Aerosol MA (E. I. du Pont de Nemours & Company), and 156 grams of ethylbenzene. The reaction mixture was stirred and refluxed for approximately three hours until no oil layer remained in the reaction flask. The temperature ranged between 60–65° C. during the reflux period. The distilled product collected was shown by fractional distillation to contain 75 percent 1-chlorotrifluoroethylene having a boiling point of −28° C.

*Example III*

The apparatus identical to that in Examples I and II was charged with 127 grams of 1,2,2-trichloro-1,1-difluoroethane, 65 grams of granular zinc, 138 grams of ammonium chloride, 300 grams of water, and 0.1 gram of perfluorooctanoic acid. The reaction mixture was stirred and refluxed for 3 hours, until no oil layer remained in the reaction flask. The reflux temperature ranged between 50°–68° C. during the reflux period. The distilled product was shown by fractional distillation to contain 95 percent 1,1-difluoro-2-chloroethylene having a boiling point of −23° C. Of the total molar quantity of reactant charged, 73 percent was converted to the desired final product.

*Example IV*

The apparatus identical to that in Examples I, II and III was charged with 152 grams of 1,1,2,3,4,4-hexafluorotetrachlorobutane, 72 grams of granular zinc, 59 grams of ammonium chloride, 250 grams of water, and 0.3 gram of perfluorooctanoic acid. The reaction mixture was stirred and refluxed for 3 hours, until there were only 5 grams of oil remaining in the flask. The reaction temperature generally was 60°–65° C. Fractional distillation of the overhead product showed 83 percent conversion to the desired product, hexafluorobutadiene having a boiling point of 5° C. and a small amount of partially reacted $C_4F_6Cl_2$ which had entrained over with the principal product. (No hydrogen-containing products were noted by mass spectroscopic analysis.)

*Example V*

The apparatus identical to that in Examples I, II, III and IV was charged with 219 grams of 1,2-dichloro-1,2-difluoro-1,2-dibromoethane, 65 grams of granular zinc, 53 grams of ammonium chloride, 250 grams of water, and 0.3 gram Aerosol MA. The mixture was stirred and refluxed for forty minutes, after which no organic material remained in the reaction flask. The reaction temperature was kept between 50°–80° C. Distillation of the final product showed an 85 percent conversion of 1,2-dichloro-1,2-difluoroethylene having a boiling point of 23° C.

While the above examples describe specific starting compounds, other starting compounds may be employed, and analogous final products obtained therefrom. For example, 1,1,2,3,4,5,5-heptafluoro-pentachloropentane has been dehalogenated by the method of the present invention and other starting materials, such as, for example, 1,2-dichloro-1,1,2,3,4,5,5-heptafluoropentane; 2,3-dibromo-1,1,2,3,4,5,5-heptafluoropentane; 1,2,4,5-tetrabromo-1,1,2,3,4,5,5-heptafluoropentane; 1,2-dibromo-1,1,2,3,4,5,6,6-octafluorohexane; 1,2,4,5-tetrabromo-1,1,2,4,5,6,6-heptafluorohexane; 1,2,5,6-tetrachloro-1,1,2,3,4,5,6,6-octafluorohexane; and the like may be employed.

Various modifications may be made in the present invention without departing from the spirit or scope thereof, and it is to be understood that we limit ourselves only as defined in the appended claims.

We claim:

1. A method for preparing fluorinated alkenes by dehalogenation of an aliphatic fluorine-containing carbon compound containing from 2 to 6 carbon atoms, a plurality of halogen atoms selected from a group consisting of chlorine and bromine where said halogen atoms other than fluorine are at least attached to adjacent carbon atoms and said adjacent carbon atoms being adjacent through a saturated bond, and where at least one of said adjacent carbon atoms has a fluorine atom attached thereto; and which comprises: contacting said fluorine-containing carbon compound at a temperature between about 0° and about 100° C. with a system containing zinc and ammonium chloride in water, and separating the resulting fluorinated alkene from the reaction mixture.

2. A method for preparing fluorinated alkenes by dehalogenation of an aliphatic fluorine-containing carbon compound containing from 2 to 6 carbon atoms, a plurality of halogen atoms selected from the group consisting of chlorine and bromine where said halogen atoms other than fluorine are at least attached to adjacent carbon atoms, and said adjacent carbon atoms being adjacent through a saturated bond, and where at least one of said adjacent carbon atoms has a fluorine atom attached thereto; and which comprises: contacting said fluorine-containing carbon compound at a temperature between about 35° and about 80° C. with a system containing zinc and ammonium chloride in water, and separating the resulting fluorinated alkene from the reaction mixture.

3. A method for preparing fluorinated alkenes by dehalogenation of an aliphatic fluorine-containing carbon compound containing from 2 to 6 carbon atoms, a plurality of halogen atoms selected from a group consisting of chlorine and bromine where said halogen atoms other than fluorine are at least attached to adjacent carbon atoms and said adjacent carbon atoms being adjacent through a saturated bond, and where at least one of said adjacent carbon atoms has a fluorine atom attached thereto; and which comprises: contacting said fluorine-containing carbon compound at a temperature between about 0° and about 100° C. with a system comprising zinc, ammonium chloride, and an organic surfactant in water, and separating the resulting fluorinated alkene from the reaction mixture.

4. A method for preparing fluorinated alkadienes by dehalogenation of an aliphatic fluorine-containing carbon compound containing from 4 to 6 carbon atoms, a plurality of halogen atoms selected from a group consisting of chlorine and bromine, where said halogen atoms other than fluorine are at least attached to adjacent carbon atoms, and said adjacent carbon atoms being adjacent through a saturated bond, and where at least one of said adjacent carbon atoms has a fluorine atom attached thereto; and which comprises: contacting said fluorine-containing carbon compound at a temperature between about 0° C. and about 100° C. with a system containing zinc and ammonium chloride in water, and separating the resulting fluorinated alkadiene from the reaction mixture.

5. A method for preparing fluorinated alkadienes by dehalogenation of an aliphatic fluorine-containing carbon compound containing from 4 to 6 carbon atoms, a plurality of halogen atoms selected from a group consisting of chlorine and bromine, where said halogen atoms other than fluorine are at least attached to adjacent carbon atoms, and said adjacent carbon atoms being adjacent through a saturated bond, and where at least one of said adjacent carbon atoms has a fluorine atom attached thereto; and which comprises: contacting said fluorine-containing carbon compound at a temperature between about 35° C. and about 80° C. with a system containing zinc and ammonium chloride in water, and separating the resulting fluorinated alkadiene from the reaction mixture.

6. A method for preparing fluorinated alkadienes by dehalogenation of an aliphatic fluorine-containing carbon compound containing from 4 to 6 carbon atoms, a plurality of halogen atoms selected from a group consisting of chlorine and bromine, where said halogen atoms other than fluorine are at least attached to adjacent carbon atoms, and said adjacent carbon atoms being adjacent through a saturated bond, and where at least one of said adjacent carbon atoms has a fluorine atom attached thereto; and which comprises: contacting said fluorine-containing carbon compound at a temperature between about 0° C. and about 100° C. with a system comprising zinc, ammonium chloride, and an organic surfactant in water, and separating the resulting fluorinated alkadiene from the reaction mixture.

7. A method for preparing 1-chloro-trifluoroethylene which comprises the contacting of 1,2,2-trichloro-trifluoroethane at a temperature between about 0° C. and about 100° C., with a system containing zinc and ammonium chloride in water, and separating the resulting chlorotrifluoroethylene from the reaction mixture.

8. A method for preparing 2-chloro-1,1-difluoroethylene which comprises contacting 1,1-difluoro-1,2,2-trichloroethane at a temperature between about 0° C. and about 100° C., with a system containing zinc and ammonium chloride in water, and separating the resulting 2-chloro-1,1-difluoroethylene from the reaction mixture.

9. A method for preparing hexafluorobutadiene-1,3, which comprises the contacting of 1,1,2,3,4,4-hexafluorotetrachlorobutane at a temperature of between about 0° C. and about 100° C., with a system containing zinc and ammonium chloride in water, and separating the resulting hexafluorobutadiene-1,3 from the reaction mixture.

10. A method for preparing 1,2-dichloro-1,2-difluoroethylene, which comprises contacting 1,2-difluoro-1,2-dichloro-1,2-dibromoethane at a temperature of between about 0° C. and about 100° C., with a system of zinc and ammonium chloride in water, and separating the resulting 1,2-dichloro-1,2-difluoroethylene from the reaction mixture.

References Cited in the file of this patent

UNITED STATES PATENTS

| | | |
|---|---|---|
| 2,774,798 | Davis et al. | Dec. 18, 1956 |
| 2,894,042 | Miller | July 7, 1959 |
| 2,903,489 | Abrams et al. | Sept. 8, 1959 |